(12) United States Patent  (10) Patent No.: US 7,991,274 B2
Kawakami  (45) Date of Patent: Aug. 2, 2011

(54) WATERPROOF COVER FOR CAMERA

(75) Inventor: Takashi Kawakami, Kyoto (JP)

(73) Assignee: Ogram Design Co., Ltd., Uji-shi (JP)

( * ) Notice: Subject to any disclaimer, the term of this patent is extended or adjusted under 35 U.S.C. 154(b) by 88 days.

(21) Appl. No.: 12/279,491

(22) PCT Filed: Feb. 22, 2007

(86) PCT No.: PCT/JP2007/053251
§ 371 (c)(1),
(2), (4) Date: Mar. 6, 2009

(87) PCT Pub. No.: WO2007/105439
PCT Pub. Date: Sep. 20, 2007

(65) Prior Publication Data
US 2009/0202232 A1  Aug. 13, 2009

(30) Foreign Application Priority Data

Feb. 23, 2006 (JP) ................................. 2006-046592

(51) Int. Cl.
*G03B 17/08* (2006.01)
(52) U.S. Cl. ........................................... 396/27; 348/81
(58) Field of Classification Search .................. 396/25, 396/27; 348/81
See application file for complete search history.

(56) References Cited

U.S. PATENT DOCUMENTS

| | | | |
|---|---|---|---|
| 3,790,644 A * | 2/1974 | Obsomer | 524/504 |
| 4,033,392 A * | 7/1977 | Less | 396/27 |
| 2005/0117897 A1 * | 6/2005 | Funahashi et al. | 396/27 |

FOREIGN PATENT DOCUMENTS

| | | |
|---|---|---|
| JP | 52-2521 A | 1/1977 |
| JP | 5-7126 U | 2/1993 |
| JP | 11-65027 A | 3/1999 |
| JP | 2003-131315 A | 5/2003 |
| JP | 2005-92070 A | 4/2005 |

OTHER PUBLICATIONS

Aneel, "Zip Lock Camera", retreived from the Internet, <http://www.instructables.com/id/Camera-Zip-lock/>, comments dating back to Aug. 30, 2005.*
Noyoun, Sam, "Diy—The Cheap Yet Shamefull Underwater Housing", retreived from the Internet, <http://www.diyphotography.net/diy_the_cheap_yet_shamefull_underwater_housing>, comments dating to Apr. 14, 2007, Internet Archive dating back to May 14, 2007.*

* cited by examiner

*Primary Examiner* — Clayton E Laballe
*Assistant Examiner* — Autumn Parker
(74) *Attorney, Agent, or Firm* — Christensen O'Connor Johnson Kindness PLLC

(57) ABSTRACT

The present invention provides a waterproof camera cover that is comparatively easy to attach to and remove from a camera, and that enables comparatively simple operation of the camera. A holder 3 is housed inside a pouch 4. It is possible to place a camera 2 in a holder 3 or take it out of the holder 3 via a first opening section 35 and a second opening section 42. A through hole 311 of the holder 3 is formed at a position facing a lens 21 of the housed camera 2. The second opening section 42 can be opened and closed, and in a closed state the second opening section 42 is waterproof. The second through hole 43 of the pouch body 4 is arranged at a position facing the first through hole 311. A transparent body 5 is arranged at a position facing a lens 21 of the camera 2. The first and second through holes 311 and 43 are closed off by the transparent body 5 so as to be watertight.

8 Claims, 10 Drawing Sheets

WATERPROOF COVER FOR CAMERA

BACKGROUND OF THE INVENTION

1. Field of the Invention

The present invention relates to a waterproof camera cover, and to a waterproof camera that uses this waterproof camera cover.

2. Description of the Related Art

A waterproof camera cover is disclosed in patent publications 1 and 2 below.

The cover disclosed in patent publication 1 makes a camera waterproof by fixing a camera cover to a camera using a ring that is fitted onto the camera. With this cover, however, since a ring is used there is a problem in that the operation of removing the cover from the camera is troublesome. Also, with this technology there is a constraint in that it is necessary for the camera to be formed in accordance with the fitting of the ring. Also, in FIG. 7 of patent publication 1, a structure is disclosed that makes a camera waterproof by covering the whole of the front of a compact camera, having a flash unit on the same body surface as a lens, with flat transparent resin. However, if the entire front of the camera is covered by flat transparent resin, light from the flash unit advances inside the transparent resin, and is reflected at an inner surface of the transparent resin, and it is easy for this light to irradiate inside the lens. If this happens, there is the drawback that the danger of deterioration in photographic quality is high.

The cover disclosed in patent publication 2 has a case formed of a flexible body of polystyrene resin or the like divided in two, and a camera is made waterproof by closing the case after stowing the camera inside. Also, waterproofing is imparted to the joint sections of the divided case by fitting a ring to the joint of the case that has been divided in two.

However, with this technology, there are problems such as (1) the operation of removing the ring is troublesome, (2) operability for operating the camera via the case is bad, and (3) if specialized machining is carried out on the case in order to improve operability of the camera, the cost of the case becomes high.

Patent Publication 1
Japanese patent laid-open No. Sho. 52-2521
Patent Publication 2
Japanese patent laid-open No. Hei. 11-65027

SUMMARY OF THE INVENTION

The present invention has been conceived in view of the above-described situation. The present invention provides a waterproof camera cover that is comparatively easy to attach to and remove from a camera, and that enables comparatively simple operation of the camera. Another object of the present invention is to provide a waterproof camera provided with such a cover.

A waterproof camera cover of the present invention is provided with a holder, a pouch body and a transparent body. The holder comprises a first storage space, a first opening section and a first through hole. The first storage section is constructed to house a camera inside. The first opening section is constructed so as to enable housing or taking out of a camera in the first storage space via this first opening section. The first through hole is formed at a position facing a lens of a camera that has been housed in the first storage space.

The pouch body comprises a second storage space, a second opening section and a second through hole. The holder is contained inside the second storage space. The second opening section is formed making it possible to fit a camera into the inside. Also, the second opening section is constructed to enable a camera to be placed in or taken out of the first storage space of the holder via the second and first opening sections, by being arranged in the same orientation as the first opening section.

The second opening section is constructed so that it can be opened and closed, and in a closed state, prevents water from leaking into the inside of the pouch body via the second opening section. The second through hole is positioned facing the second through hole.

The transparent body is arranged at a position facing a lens of the camera.

The first and second through holes are closed off by the transparent body so that water is prevented from leaking to the inside of the pouch body or the holder from the outside.

With the present invention, it is possible to have a structure where water is prevented from leaking into the holder through the first through hole, by closely attaching a peripheral edge of the first through hole and a peripheral edge of the transparent body. It is also possible to have a structure where it is possible to prevent water from leaking between the pouch body and the holder through the second through hole by closely attaching a peripheral edge of the second through hole and a peripheral edge of the first through hole.

The pouch body of the present invention can be provided with a folded section having at least one pleat. The folded section is formed so that the pouch section is folded inwards close to an end part. Further, the folded section is formed to a depth such that a user's finger will reach a winding section of the camera, in a state where a user's finger is inserted into the inside of the folded section. In so doing, it is possible to carry out a winding operation for the camera using a finger inserted inside the folded section.

The pouch body of the present invention is preferably formed of a material that is very flexible and is waterproof, such as vinyl chloride. In this way, the task of operating the camera from outside the pouch body is made easy.

The pouch body of the present invention is preferably made using a transparent material. In this case, looking at the camera from outside the pouch body is made easy, and operation of the camera is made extremely easy.

The holder of the present invention can be shaped to cover the entire camera. In this case, positioning of the camera with respect to the holder becomes comparatively accurate.

The transparent body of the present invention can be formed using a hard material such as polycarbonate. In this case, since there is little unexpected deformation in the transparent body, there is little danger of light beams incident on the lens of the camera being irregularly dispersed, and it is possible to improve photographic quality.

A camera of the present invention can be provided with a viewfinder, a flash unit, a shutter button and a winding section. Further, the holder of the present invention can be provided with one or a plurality of other through holes formed at positions facing the viewfinder, flash unit, shutter button and winding section. In this way, looking through the viewfinder, irradiation of light of the flash unit, operating the shutter button and winding on operations are made easy using the through holes.

A waterproof camera of the present invention is provided with any of the previously described waterproof camera covers, and a camera. This camera is housed inside a first storage space in the holder. Further, a lens of the camera is arranged at a position corresponding to the first through hole of the holder. With this waterproof camera, the camera is made waterproof using the waterproof camera cover.

According to the present invention, it is possible to provide a waterproof camera cover that is comparatively easy to attach to and remove from a camera, and that enables comparatively simple operation of the camera. Also according to the present invention it becomes possible to provide a waterproof camera provided with such a cover.

DETAILED DESCRIPTION OF THE PREFERRED EMBODIMENTS

Structure of a First Embodiment

Figure 1:
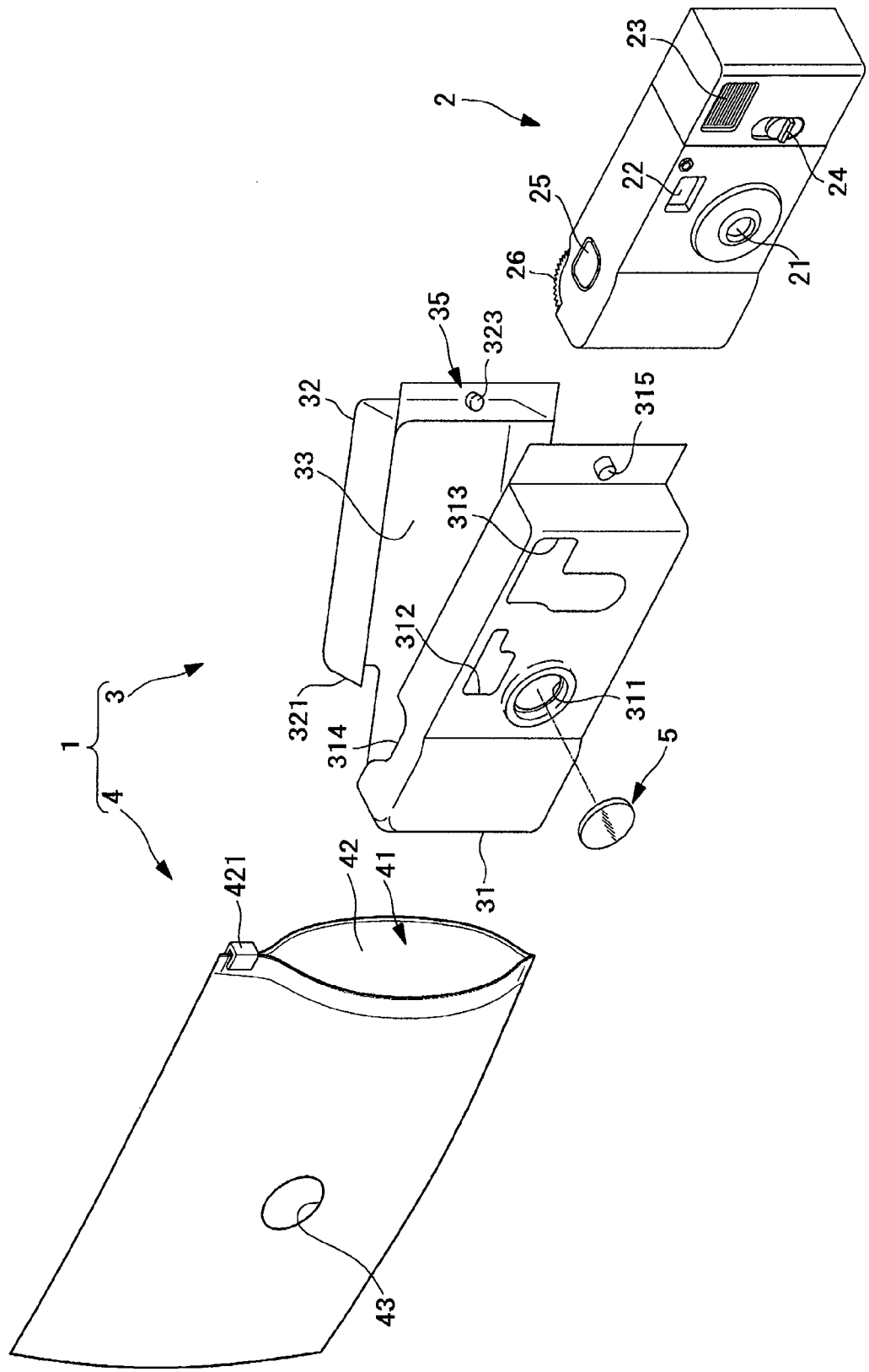
FIG. 1 is a broken down perspective view of a water proof camera cover of a first embodiment of the present invention.

A waterproof camera cover 1 of a first embodiment of the present invention (hereafter abbreviated where appropriate to "cover") will be described with reference to the attached drawings.
(Camera Structure)

First of all, a camera 2 fitted with this cover 1 will be described based on FIG. 1. As the camera 2, in this embodiment a single use camera is used. However, besides the single use camera, it is also possible to use a normal film camera, digital camera or infrared camera as the camera fitted with the cover 1. It is also possible for the camera to be a mobile phone with camera or a video camera, as long as it is an imaging device provided with a photographic lens.

The camera 2 of this embodiment is provided with an imaging lens 21, a viewfinder 22, a flash unit 23, a switch for flash operation 24, a shutter button 25, and a winding section 26. With this embodiment, the winding section 26 is a dial shape, and it is possible to wind on a film by rotating the dial in an anti-clockwise direction. It is also possible to provide the camera 2 with a display window for the number of remaining frames, and a sensor for distance to the subject, but these are omitted from the drawing. This type of camera 2 is well known, and so more detailed description will be omitted.
Structure of Waterproof Cover The cover 1 of this embodiment is provided with a holder 3, a pouch body 4, and a transparent body 5 as main components (refer to FIG. 1).

(Holder Structure)

The holder 3 is provided with a front surface section 31 and a rear surface section 32. The front surface section 31 and the rear surface section 32 are formed with respectively opposed sections being concave. Because of this structure, a first storage space 33 is formed between the front surface section 31 and a rear surface section 32. The first storage section 33 is formed capable of housing the single use camera (specifically a camera) 2 inside.

The front surface section 31 and the rear surface section 32 of the holder 3 are connected to a connecting section 34 of one side (the left side in FIG. 1). With this embodiment, the front surface section 31, the rear surface section 32 and the connecting section 34 are integrated (refer to FIG. 3), and opening and closing is possible by folding at the connecting section 34.

The side of the holder 3 opposite to the connecting section 34 constitutes the first opening section 35. The first opening section 35 is constructed so as to enable housing or taking out of a camera 2 in the first storage space 33 via this first opening section 35.

The holder 3 of this embodiment is formed overall using resin that has been vacuum molded. As the resin material, it is preferable to use a comparatively hard resin, for example, hardened PVC (polyvinyl chloride), PP (polypropylene) or PET (polyethylene terephthalate). As a resin forming method, other methods are also possible, but in the case of vacuum molding it is preferable to use a method that makes it easy to obtain the required precision while being comparatively inexpensive. It is also possible to carry out molding using an injection method.

Figure 3:
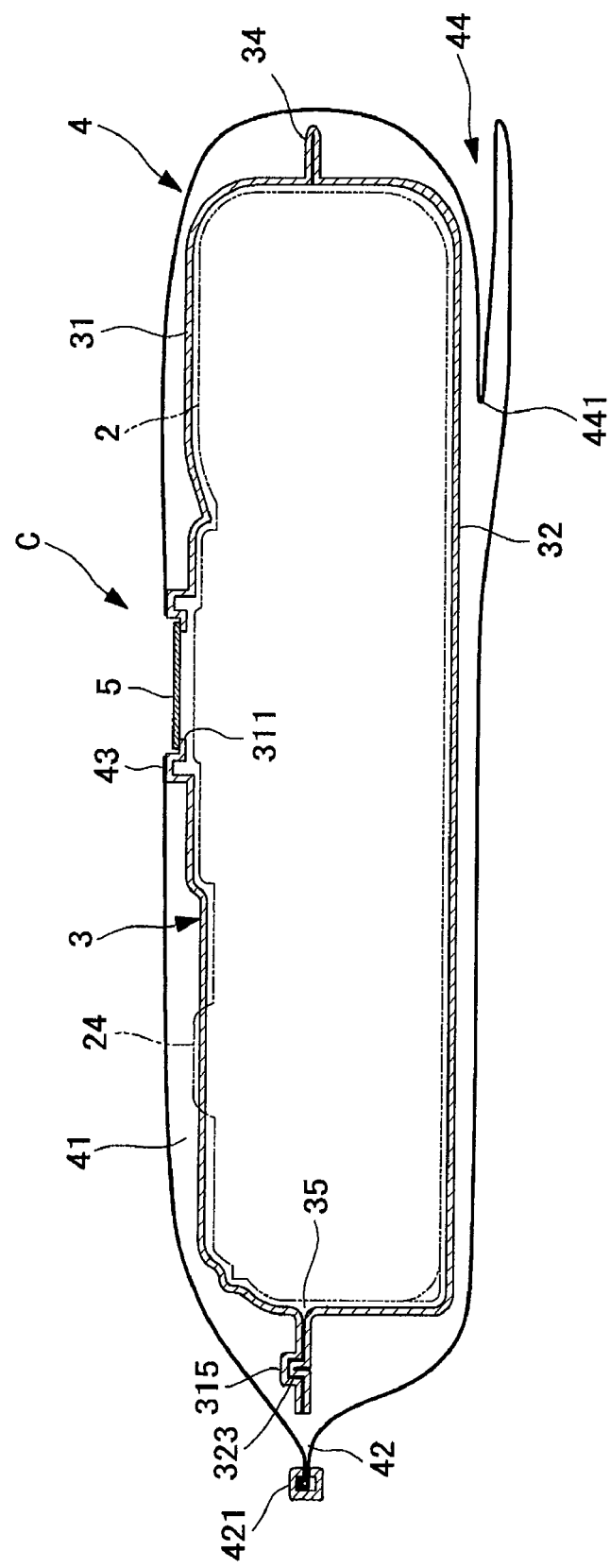
FIG. 3 is an enlarged schematic cross sectional view along line A-A in FIG. 2, and is a drawing of a state where the lens of the camera is facing upwards.

Also, the holder 3 of this embodiment is shaped to cover the whole of the camera 2 in a state where the camera 2 is housed in the storage space 33 (refer to FIG. 3). The holder 3 in this embodiment is preferably made opaque overall (in particular, opaque with respect to light from the flash unit 23). If this is done, light from the flash unit 23 can be prevented from entering the lens 21 by passing through the inside of a thickened part of the holder 3, and it is possible to prevent deterioration in photographic qualities.

A through hole 311 for in front of the lens (equivalent to the first through hole of the present invention), a through hole 312 for in front of the viewfinder, a through hole 313 for in front of the flash unit and a through hole for the shutter are formed in the front surface part 31 of the holder 3. As a method of forming these through holes, it is possible to use an appropriate method such as notching by cutting or punching part of the front surface section 31.

The through hole 311 for in front of the lens (first through hole) is formed at a position facing the lens 21 of the camera 2 that is housed in the first storage space 33. Similarly, the through hole 312 for in front of the viewfinder is formed at a position facing the viewfinder 22 of the camera 2, and the through hole 313 for in front of the flash unit is formed at a position facing the flash unit 23 of the camera 2. The through hole 313 for in front of the flash unit extends to a position facing the flash operating switch 24. That is, the through hole 313 of this embodiment also functions as a through hole for the flash operating switch 24. The through hole 314 for the shutter is formed above the shutter button 25, making it easy to operate the shutter button 25.

Further, an indent 315 for closing the opening section 35 is formed in a flange section of the front surface part 31 of the holder 3 (refer to FIG. 3).

Figure 4:
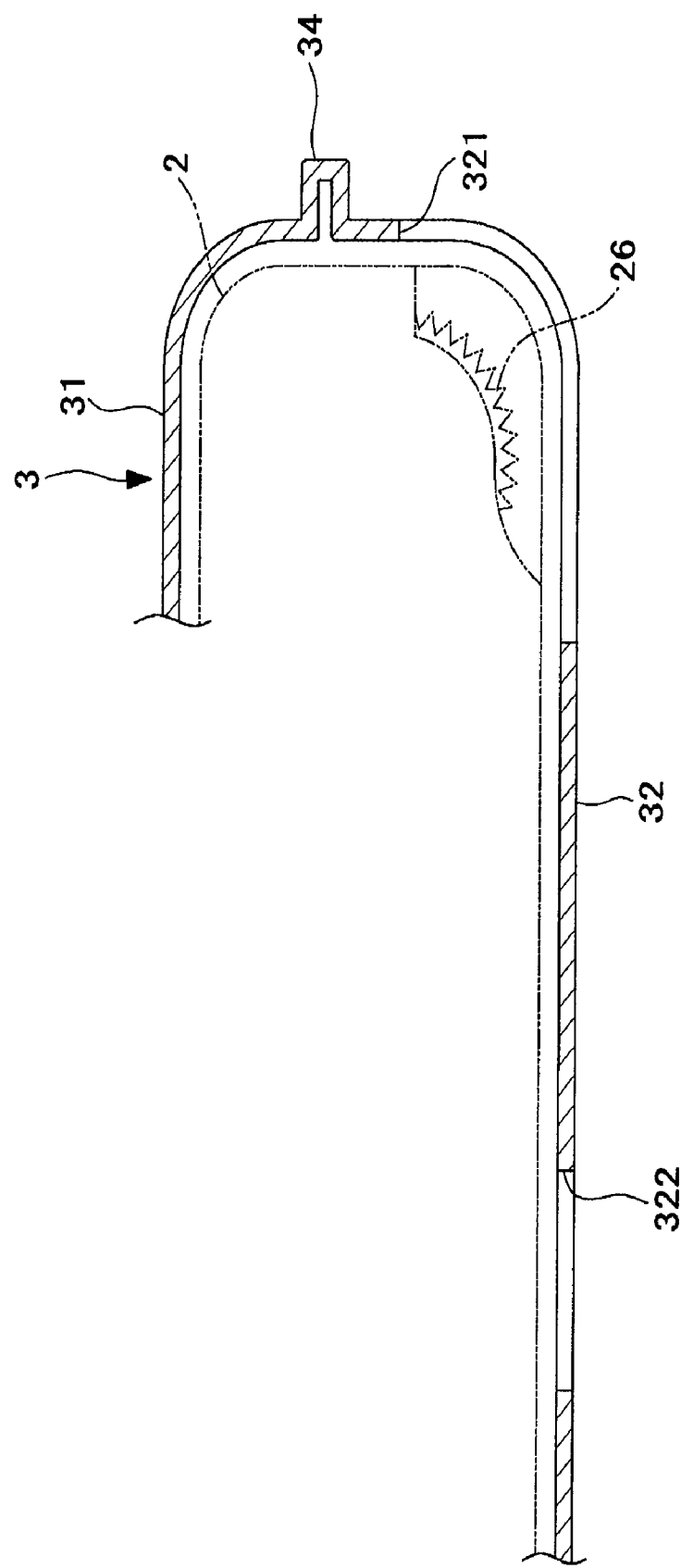
FIG. 4 is an enlarged cross sectional view of a holder, taken in the direction of arrows B-B in FIG. 5.
Figure 5:
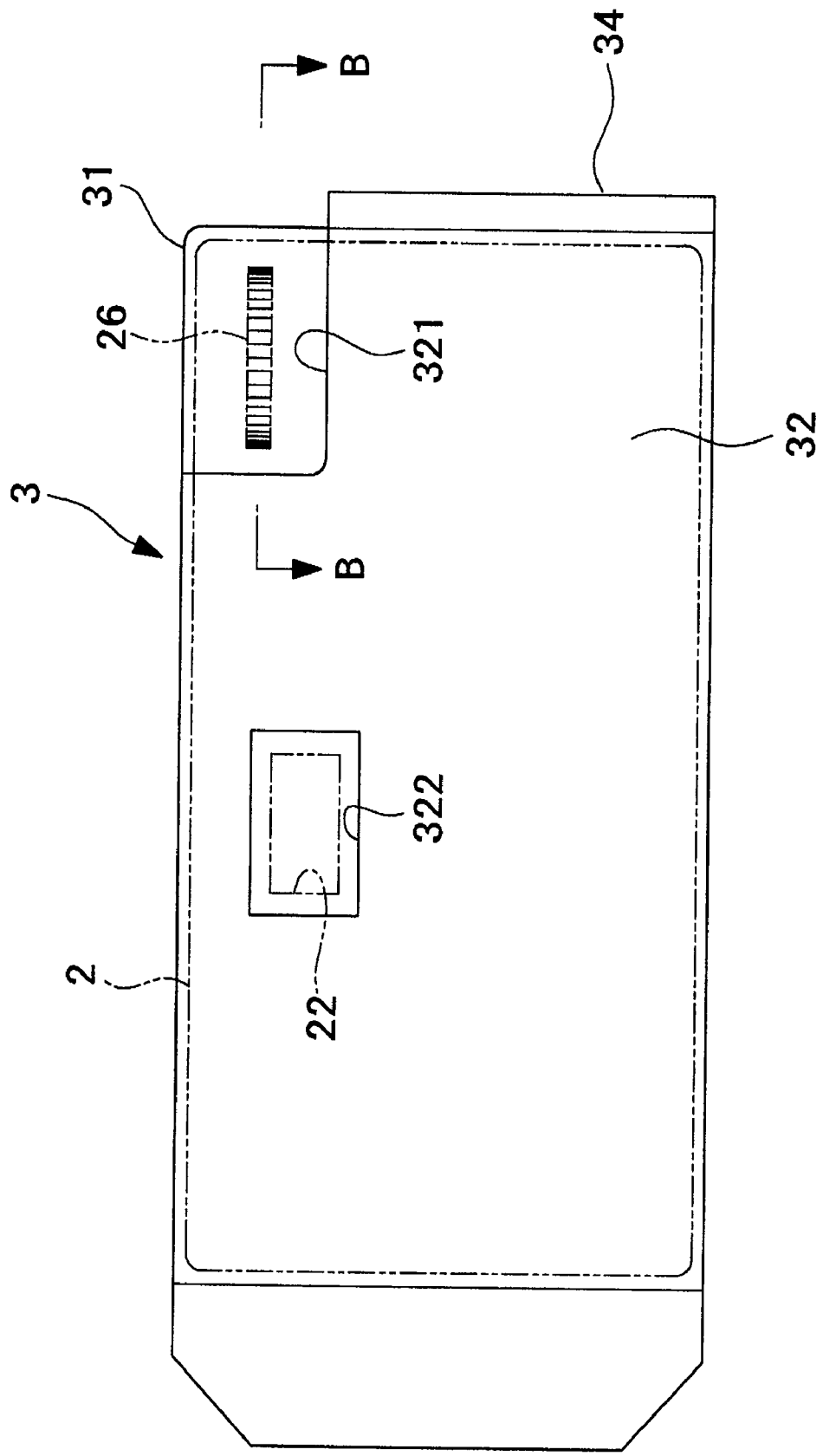
FIG. 5 is a rear view of a holder in a state where a camera is housed inside.

A through hole 321 for the winding section and a through hole 322 for the viewfinder are formed in the rear surface part 32 of the holder 3 (refer to FIG. 4 and FIG. 5).

The through hole 321 for the winding section is arranged at a position facing the winding section 26 of the camera 2, and the winding section 26 is exposed so as to make it possible to operate the winding section 26 from outside the holder 3. Also, the through hole 321 extends to a section facing the shutter button 25 of the camera 2. That is, the through hole 321 also acts as a through hole for exposing the shutter button 25. The through hole 321, together with the through hole 314 of the front surface section 31, exposes the shutter button 25 making operation of the shutter button 25 easy (refer to FIG. 1).

The through hole 322 for the viewfinder is arranged at a position facing the viewfinder 22 at the rear surface side of the camera 2 (refer to FIG. 5).

Also, a protrusion 323 for closing the opening section 35 by being inserted into the indent 315 is formed in a flange section of the rear surface part 32 (refer to FIG. 3).

(Pouch Body Structure)

The pouch body 4 is comprised of a second storage space 41, a second opening section 42, a second through hole 43 and a folding section 44 (refer to FIG. 3).

Figure 2:
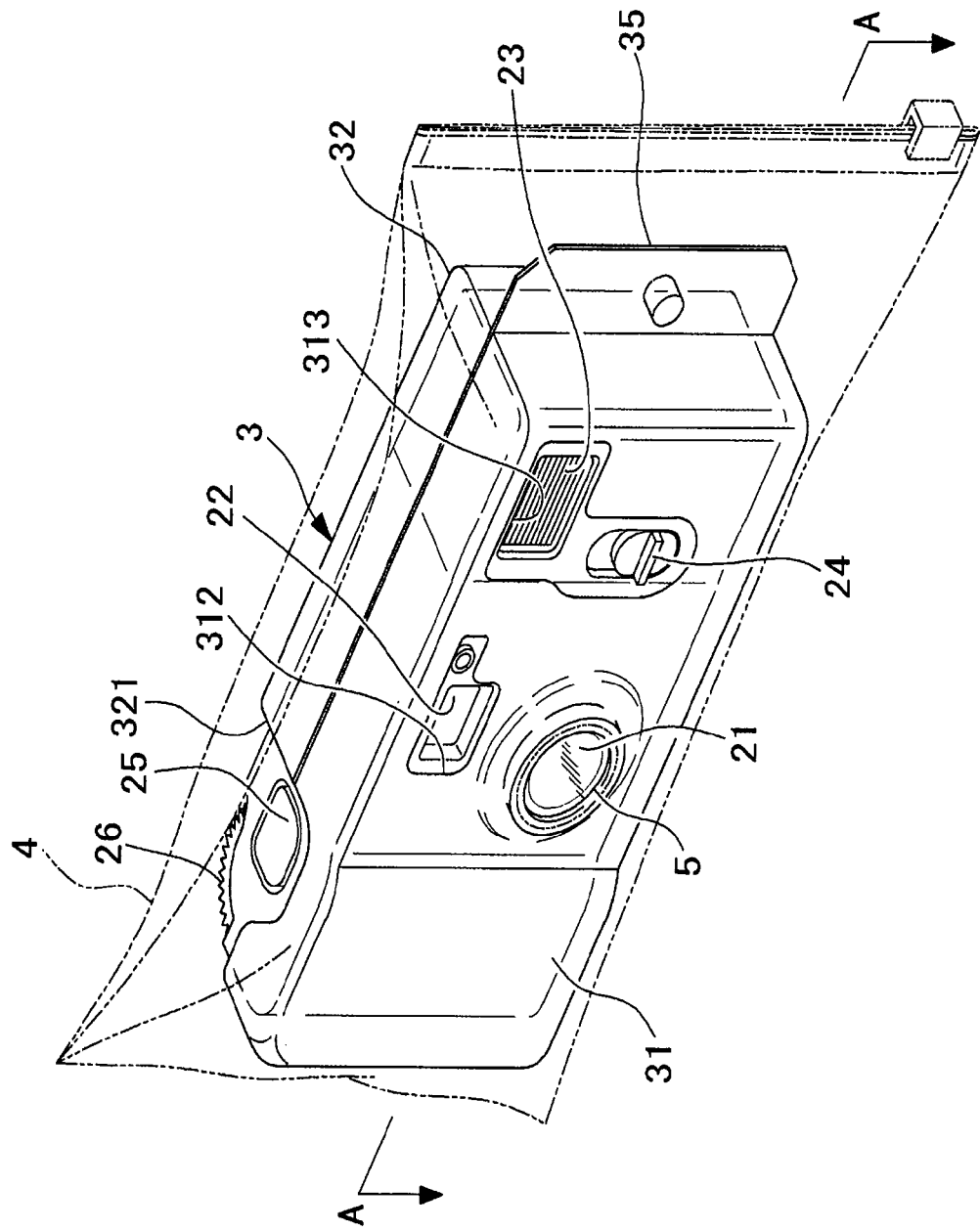
FIG. 2 is a schematic perspective view of a state where a camera is housed inside the cover of FIG. 1

The second storage section 41 is a space inside the pouch body 4. The holder 3 is contained inside the second storage space 41 (refer to FIG. 1 to FIG. 3).

The second opening section 42 is formed by opening up one end side (the right end side in FIG. 1) of the pouch body 4. The second opening section 42 is formed in a side that makes it possible to fit a camera 2 into the inside. Here, the fact that boundary length of the opening section 42 is double or more the boundary length of the camera 2 (the maximum projected surface area in the insertion direction) makes insertion easy.

Also the second opening section 42 is constructed to enable the camera 2 to be housed or taken out of the first storage space 33 of the holder 3 via the second and first opening sections 42 and 35, by being arranged in the same orientation as the first opening section 35 (refer to FIG. 1 and FIG. 3).

Further, the second opening section 42 is constructed so that it can be opened and closed by operating a slider 421, and in a closed state, prevents water from leaking into the inside of the pouch body 4 via the second opening section 42. As a method enabling opening and closing of the second opening section 42 and closing in a watertight manner, it is possible to use many known methods.

The second through hole 43 is arranged at a position facing the through hole (first through hole) 311 for in front of the lens in the holder 3.

The folding section 44 of the pouch body 4 has at least one pleat (refer to FIG. 3). This folded section 44 is formed by folding the pouch section 4 inwards close to an end part. The folding section 44 is formed with an outer part open, and with a bottom section 441 at an inner side of the pouch body 4. With this embodiment, in this manner, a state where one bottom section is formed at an inner side of the pouch body 4 and where the outer part is open is referred to as "having one pleat". If folded a plurality of times so as to have a plurality of bottom sections, it has a plurality of pleats.

Figure 6:
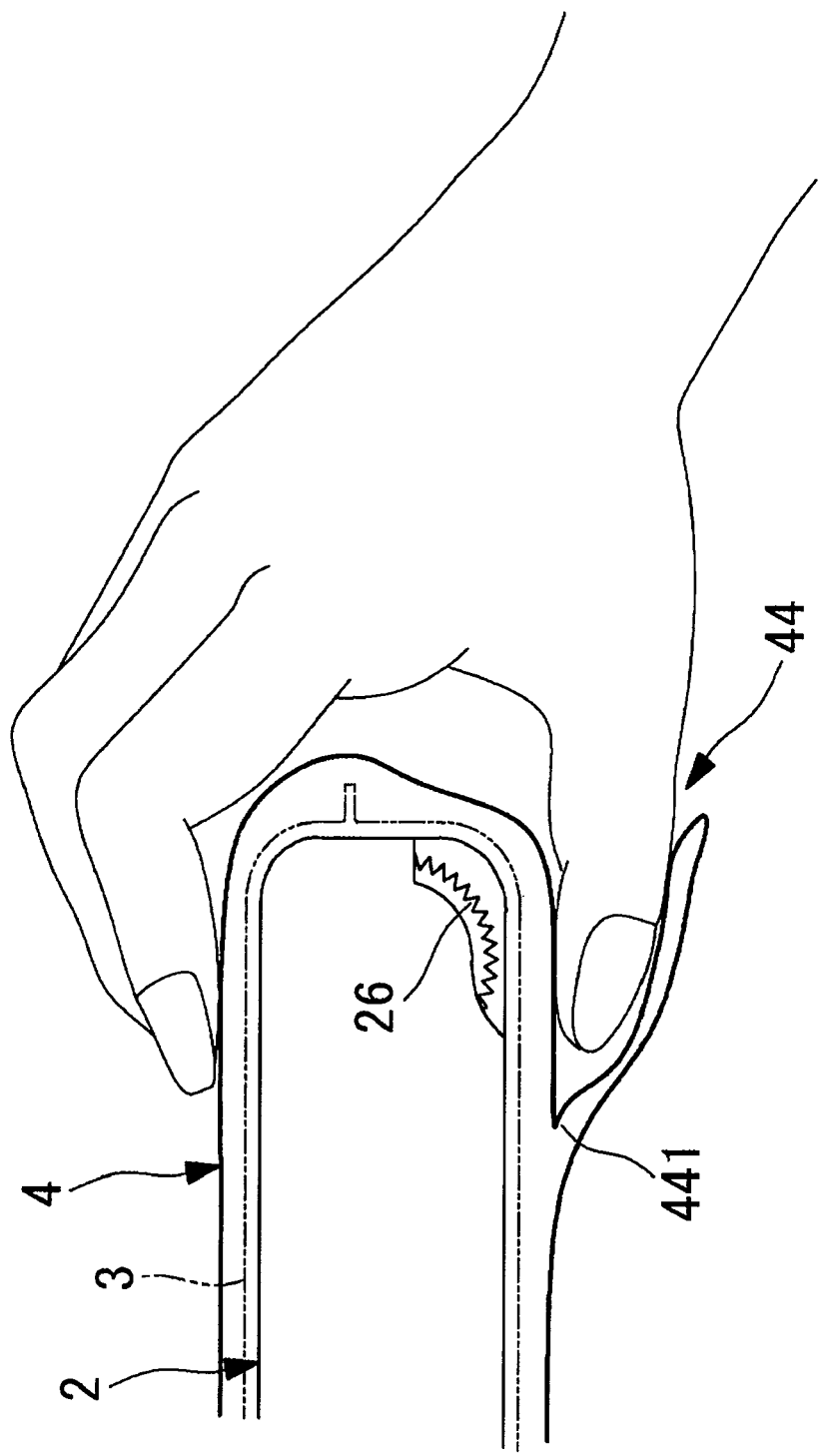
FIG. 6 is an explanatory drawing for describing a usage method of a folding section of a pouch body, and is a cross sectional drawing of a pouch body close to a folding section.

Further, the folded section 44 is formed to a depth such that in a state where a user's thumb is inserted into the inside of the folded section 44, this thumb will reach a winding section 26 of the camera 2 (refer to FIG. 6).

The pouch body 4 of this embodiment is preferably formed of a material that is very flexible and is waterproof, such a poly vinyl chloride.

Also, the pouch body 4 of this embodiment is preferably formed using transparent resin, in order to view the state of the camera 2. However, it is possible to create a design on the pouch body 4 to an extent that does not impair viewing and operation of the camera 2.

(Transparent Body Structure)

The transparent body 5 is arranged at a position facing a lens 21 of the camera 2. The transparent body 5 of this embodiment is formed as a circular plate. Also, the transparent body 5 is made substantially transparent with respect to light that is to be made incident on the camera 2 (visible light if it is a camera for visible light). The transparent body 5 is preferably formed using a transparent and hard material, like hardened resin such as polycarbonate.

Figure 7:
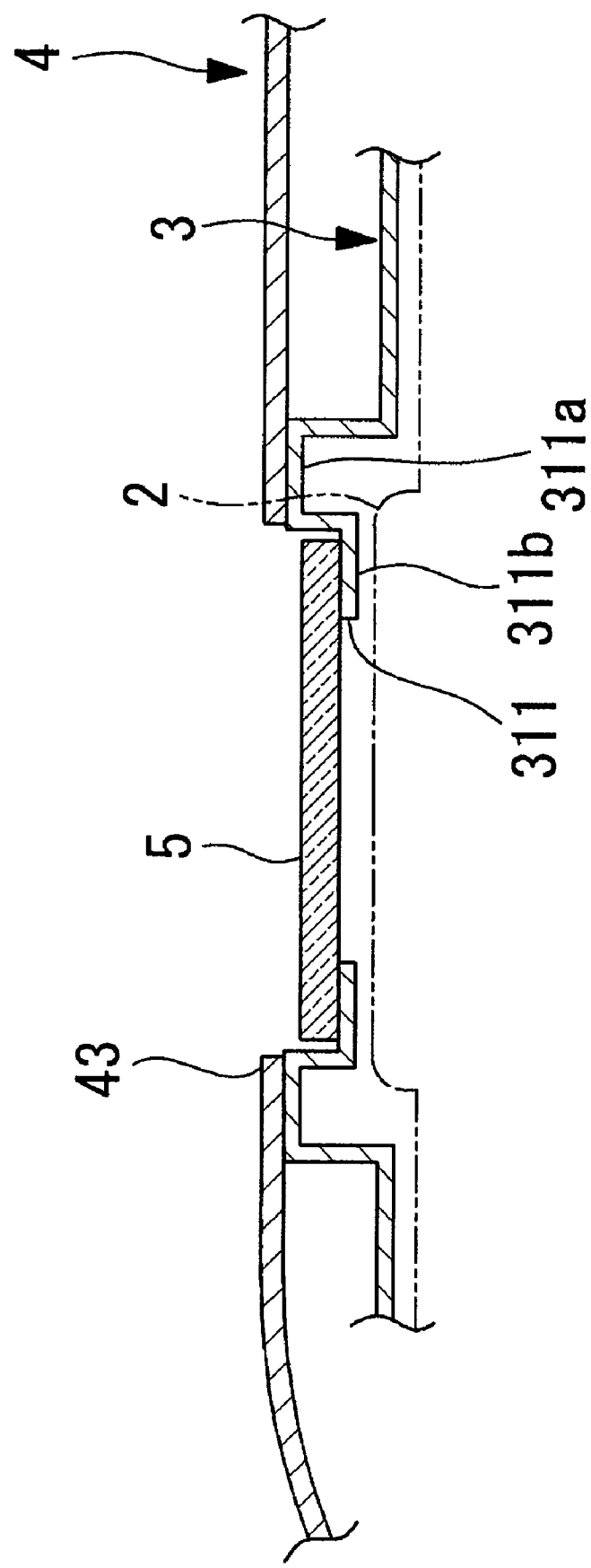
FIG. 7 is an enlarged drawing of a section shown by arrow C in FIG. 3.

Further, as shown in FIG. 7, a peripheral edge of the through hole 311 (first through hole) in front of the lens of the camera 3 and a peripheral edge of the transparent body 5 are closely joined. As a result, this gives a structure that prevents water leaking into the holder 3 via the first through hole 311. As means for joining the peripheral edge of the through hole 311 and the transparent body 5, it is possible to use ultrasonic welding, for example. However, it is also possible to bond the two together by means of an adhesive material such as glue or double sided tape. It is also possible to interpose another member (or part of the pouch 4) between the two. Also, as means for bonding the open peripheral edge of the through hole 311 and the transparent body 5, it is possible to use a method for integrally forming them. For example, it is possible to form the holder 3 and the transparent body 5 by injection molding (for example, insert molding or double injection molding).

Further, with this embodiment, as shown in FIG. 7, a peripheral edge of the second through hole 43 and a peripheral edge of the first through hole 311 are closely joined. As a result, this gives a structure that prevents water infiltrating between the holder 3 and the pouch body 4 via the second through hole 43. As means for closely bonding the peripheral edge of the through hole 43 and the peripheral edge of the through hole 311, it is possible to join the two together using means such as ultrasonic welding. However, it is also possible to interpose another member (it is also possible to use part of the transparent body 5) between the two, and it is possible to use glue or double-sided tape. In the case of using ultrasonic welding, making the welded parts (peripheral edges of the two through holes) of the cover 4 and the holder 3 the same material is in order to improve weld strength. Also, it is possible to closely bond the peripheral edge of the through hole 43 to the peripheral edge of 311 via the transparent body 5 by closely bonding the peripheral edge of the second through hole 43 to the transparent body 5.

With this embodiment, because of the above-described structure the first and second through holes 311 and 43 are closed off by the transparent body 5, and as a result it gives a structure that prevents water leaking into the pouch body 4 and the holder 3 from the outside. In this way, in this specification "closed off by the transparent body 5" includes not only the case of closing off with the transparent body 5 only, but also the case of closing off in cooperation with other members. For example, the second through hole 43 of this example is closed off by cooperative action between the peripheral edge of the first through hole 311 and the transparent body 5. In short, it is possible to close off substantially using the transparent body 5.

Also with this embodiment, by making part of the peripheral edge of the first through hole 311 project to the front so as to be concentric with the through hole 311, a projection section 311a is formed (refer to FIG. 7). A peripheral edge part of the second through hole 43 is bonded to the surface side of the projecting section 311a. Further, a flange section 311b is formed on an inner side of the projecting section 311a. A peripheral edge section of the transparent body 5 is bonded to the surface side of the flange section 311b. By arranging the transparent body 5 at an inner side of the projecting section 311a, it is possible to prevent scratching of the transparent body 5. Also, if the uneven shape of the peripheral edge of the first through hole 331 is made to approximate the uneven shape of the peripheral edge of the lens 21, then since the two peripheral edges are loosely joined the possibility of positional error between the camera 2 and the holder 3 is reduced.

The transparent body of this embodiment is made substantially parallel to the lens 21 of the camera 2 (more preferably, orthogonal to the optical axis of the lens 21).

Function of a First Embodiment

Next, the method of using the cover 1 of his embodiment will be described. As a prerequisite, the cover 1 of this embodiment, at the time of use, as described above, has the peripheral edge of the first through hole 311, the peripheral edge of the second through hole 43 and the transparent body 5 bonded together. In this way, the holder 3, pouch body 4 and transparent body 5 can not move relative to each other at these bond points. Also, for the sake of description, in an initial state the opening section 35 of the holder 3 and the opening section 42 of the pouch body 4 are both closed.

First, the method of attaching the cover 1 to the camera 2 will be described. A user first opens the opening section 42 of the pouch body 4, and also opens the opening section 35 of the holder 3. A state where the opening section 35 of the holder 3 is open slightly is shown as an exploded view in FIG. 1.

Then, the user arranges the camera 2 in the storage space 33 of the holder 3, through the opening section 42 of the pouch body 4 and the opening section 35 of the holder 3. Next, by closing the opening section 35 and the opening section 42, it is possible to attach the cover 1 to the camera 2. When removing the camera 2 from the cover 1, the opening section 42 and the opening section 35 are opened, the camera 2 is held in the user's fingers, and taken out from the storage space 33 of the holder 3.

With the cover 1 of this embodiment, there is the advantage that by opening and closing the two opening sections 42 and 35, it is possible to easily attach or remove the camera 2.

Also, with the cover 1 of this embodiment, since the two opening sections 42 and 35 are arranged in the same orientation (refer to FIG. 1), it is possible to attach and remove the cover to and from the camera extremely easily.

Further, with the cover of this embodiment, operation (for example, operation of the shutter button 25) of the camera 2 arranged inside the cover 1 can be carried out from outside the pouch body 4. Therefore, with this embodiment, there is the advantage that it is easy to operate the camera 2.

Also, with the cover 1 of this embodiment, the first through hole 311 is formed in the holder 3, the second through hole 43 is formed in the pouch body 4, the second through hole 43 is arranged at a position facing the first through hole 311, and the transparent body 5 is arranged at a position facing the lens 21 of the camera 2. Therefore, in a state where the camera 2 is fitted into the holder 3, the transparent body 5 is arranged in front of the lens 21 of the camera 2. Accordingly, according to this embodiment it is possible to have light from outside be incident on the lens 21, and it is possible to take pictures using the camera 2.

Also, if the transparent body 5 is made from a hard material such as polycarbonate, it is possible to reduce irregular bending and reflecting of incident light, and it becomes possible to improve photographic qualities.

Further, with this embodiment, since the first and second through holes 311 and 43 are closed off by the transparent body 5, so as to prevent water leaking into the pouch body 4 and the holder 3 from the outside, it is possible to improve the waterproofing characteristics of the cover 1.

Also, with this embodiment, a peripheral edge of the second through hole 43 and a peripheral edge of the first through hole 311 are closely joined, which means that there are also the following advantages. In the case where the camera 2 is provided with a flash 23, if the periphery of the camera 2 is covered by the transparent member some of the light that is reflected by the inside of the transparent member reaches the lens 21, and photographic quality will be deteriorated. Contrary to this, with this embodiment light travelling between the holder 3 and the pouch body 4 can be prevented by the joint sections of the peripheral edge of the second through hole 43 and the peripheral edge of the first through hole 311. In this way, the possibility of reflected light entering into the lens 21 is reduced, and it becomes possible to improve photographic qualities.

Figure 8:
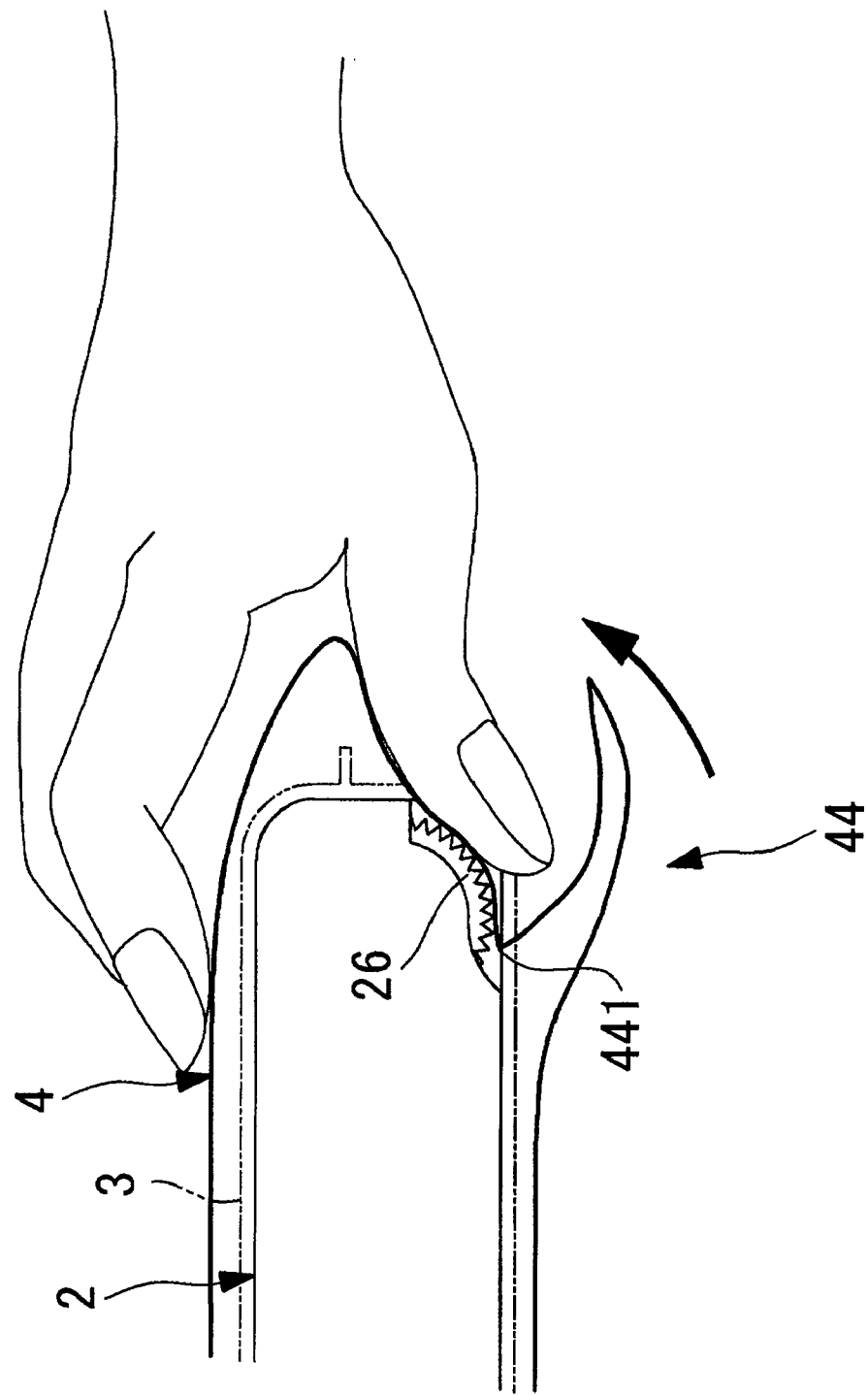
FIG. 8 is an explanatory drawing for describing a usage method for a folding section of the pouch body.

Further, the pouch body 4 of this embodiment is provided with a folding section 44 having at least one pleat, which means that as shown in FIG. 6, it is possible for the user to insert a finger into the folded section 44 and perform operation of the camera 2. In particular, with this embodiment, it is possible for the user's finger to come into contact with the winding section 26 of the camera 2. Further, with this embodiment by appropriately moving the finger in this state, as shown in FIG. 8, the folding section 44 is deformed and is possible to carry out a winding operation for the winding section 26. Accordingly, there is the advantage that it is easy to carry out a winding operation for film in the camera 2. Naturally, it is preferable to appropriately change the depth and shape of the folding section according to the position of the winding section. Also, in a camera that does not require winding, such as a digital camera, the folding section for winding can be omitted. Of course, it is possible to use the folding section 44 for operations other than winding, and in that case the shape and depth of the folding section 44 are set depending on the operation. For example, it is also possible to have an operating method where a forefinger is inserted into the folding section 44, and the shutter button 25 is operated by this finger.

Here, in order to make operation of the winding section 26 easy, the pouch 4 itself is made large, and it is possible to omit formation of the folding section. However, even if this is done, since an amount by which the pouch 4 can move relative to the camera 2 is not stable, it is easy for the winding operation to become difficult. Conversely, with this embodiment the folding section 44 is formed, which means that it is possible to substantially automatically ensure amount of relative movement between the pouch 4 and the camera 2 depending on an amount of folding (folding depth or number of pleats). Further, after carrying out a winding operation, it is possible to ensure an amount of folding required in the next winding operation by restoring to a shape close to the initial folded shape. In this way, according to this embodiment it is possible to make the winding operation easy.

Also, the pouch body 4 of the above-described embodiment is formed from a material that is highly flexible and is waterproof, which means that not only is it possible to improve waterproofing of the camera 2, but there is also the advantage that operating the camera 2 from outside the pouch body 4 is made easy.

Further, the pouch body 4 of the above-described embodiment is formed from a transparent material, which means that there is the advantage that it is easy to view the camera 2 from outside the pouch body 4, and operation of the camera 2 becomes easy. Also, since it is possible to look into the viewfinder 22 of the camera 2 from outside the pouch body 4, it is not necessary to provide a through hole in the pouch body 4 at a place corresponding to the viewfinder 22. In the case where a through hole is provided in the pouch body 4, means for closing off the through hole in a watertight manner becomes necessary, there is a danger of water leaking from this opening, and further, the operation of fitting the cover becomes complicated. Conversely, with this embodiment, it is possible to omit such a through hole, which means that waterproofing is improved, and further, the number of components is reduced enabling a reduction in cost, and the operation of fitting the cover is made easy.

Also, since no special operations for making the pouch body 4 are required, it is possible to envisage reduction in cost.

Further, the holder 3 of this embodiment is shaped to cover the entire camera 2, which means that accurate positioning of a camera housed in the holder 3 with respect to the holder 3 is made easy. Therefore, it is possible to achieve comparatively accurate positioning between structural elements such as the lens 21 and the transparent body 5, and the winding section 26 and the folding section 44. As a result there is the advantage that various operations can be carried out accurately and easily, such as taking pictures and winding on the film.

Also, with the camera of this embodiment, in a state where the holder 3 is attached to the pouch body 4 (refer to FIG. 3), the holder 3 is arranged not at an outer side of the bottom section 441 of the folding section 44 (lower side in FIG. 3), but at an inner side of the bottom section 441. In the case where the holder 3 is arranged at an outer side of the bottom section 441 of the folding section 44 (lower side in FIG. 3), even if the folding section 44 is used, operation of the winding section 26 becomes difficult. Conversely, with this embodiment, the holder 3 and the pouch body 4 are joined in advance in front of the lens 21 of the camera 2. This means that according to this embodiment, even if the pouch body 4 is manufactured with a flexible material, it is possible to arrange the holder 3 at the correct position of the pouch body 4 in advance.

Also, because the holder 3 of this embodiment is provided with the through holes formed at positions facing the viewfinder 22, the flash 23, the flash operating switch 24, the shutter button 25 and the winding section 26 of the camera 2, there is the advantage that it is easy to see the subject through the viewfinder 22, and it is easy to operate the camera 2.

Further, with this embodiment, since the holder 3 is covered by the pouch body 4, even if the through holes are formed in the holder it is possible to prevent water leaking in to the camera.

Also with this embodiment, it is possible to make the camera water proof simply using the cover 1, without any special treatment of the camera.

Further, according to the cover 1 of this embodiment, there is the advantage that it can be easily applied to a camera having a lens on a body surface (for example, a portable phone with built-in camera or a compact digital camera), of a shape that would be difficult to fit a fixing ring to.

Also with the cover 1 of this embodiment, since the transparent body 5 facing the lens 21 is brought close to the lens 21 and made parallel to it, it becomes possible to prevent or reduce flash light entering into the lens 21.

Further, with the cover 1 of this embodiment, since it is possible to have a configuration with three components that are basically inexpensive and mass produced (holder, pouch body and transparent body) manufacture is easy and it is possible to suppress costs.

Also, the cover 1 of this embodiment bonds the holder 3 and the pouch 4 using suitable bonding means such as welding, which means that if the opening section 42 of the pouch 4 is opened to expand one of the pouch 4 or the holder 3, the other is also opened in a linked fashion. Attaching the camera 2 is therefore extremely easy.

Further, with a conventional waterproof cover, in order to attach to a camera it as necessary to subject the camera to specialized treatment. With this cover, attachment to a camera available on the market was not possible, and reusing the cover was difficult, and so there was a problem in that it was difficult to envisage effective utilization of resources. Conversely, with the cover 1 of this embodiment no special processes are required for the camera, and so after using the camera 2, as required, it can be replaced with another camera available on the market (although it is preferably of the same shape). Therefore, repeated use of the cover 1 becomes possible, contributing to effective use of resources.

Further, with this embodiment it is also possible to carry out printing on the entire surface of the pouch 4, and if this is done it is likely to catch the eye of consumers, and there is the advantage that it can exhibit high advertising effectiveness. Naturally, in the event that decoration is printed on the pouch 4, it is preferable for places required for operating and viewing the camera 2 from outside to be made transparent.

Also, waterproof cameras are often used in places where there is a lot of direct sunlight, and in summertime. On the other hand, with a lot of current waterproof cameras, since they are waterproof they are manufactured so that it is not easy to open up the camera cover in order to maintain the waterproof state. With this type of structure, if the internal pressure of the case is raised due to increase in temperature, there is a danger of case damage and warping. If the case is warped, members of the lens front surface will be deformed or moved, and so there is a danger of degradation in photo quality. Conversely, with this embodiment, by appropriately opening the second opening section 42 of the pouch 4 it is possible to easily let internal air escape to the outside (when it is required to be waterproof, it is possible to close the opening section 42 again). Also, with this embodiment transparent body 5 is bonded to the peripheral edge of the first through hole 311 of the holder 3, which means that regardless of deformation of the pouch 4 it is possible to maintain the transparent body 5 substantially parallel to the lens 21, and it is possible to prevent lowering of photographic quality. Here, with the holder 3 of this embodiment, in the first place, since it is not necessary to have an airtight structure (waterproofing is achieved with the pouch body 4), it is possible to easily prevent rise in internal pressure of the holder 3. For example, it is possible to prevent rise in internal pressure by adjusting the shape of the through hole in the holder 3 and degree or air tightness of the closed state of the first opening section 35.

Further, with this embodiment it is possible to prevent deformation of the holder 3 with the camera 2 by forming the internal surface shape of the holder 3 so as to run substantially along the camera 2. It is therefore possible to make the holder thinner, and it becomes possible to significantly reduce the manufacturing cost.

Second Embodiment

Figure 9:
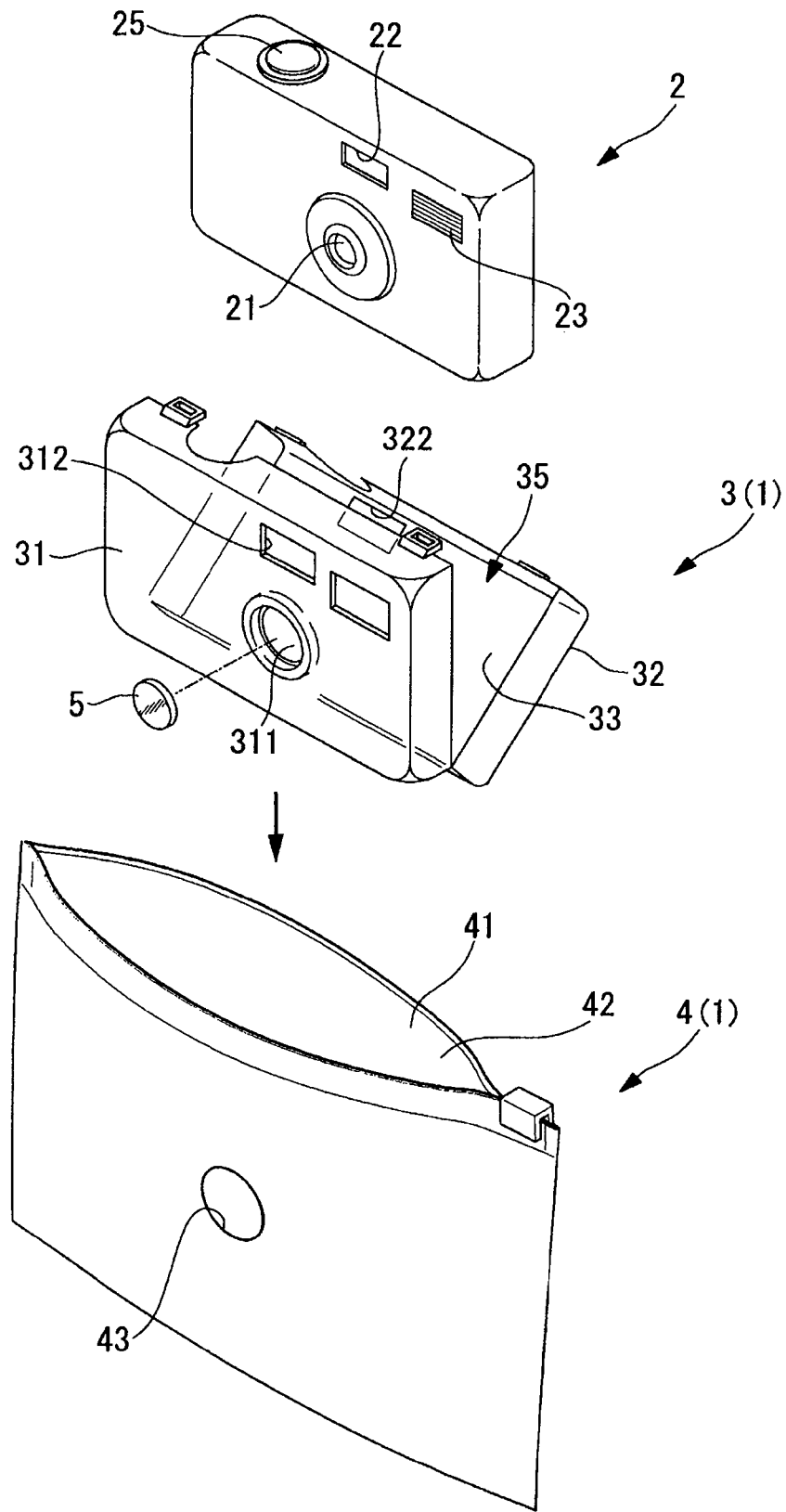
FIG. 9 is a broken down perspective view of a waterproof camera cover of a second embodiment of the present invention.

Next, a waterproof cover of a second embodiment of the present invention will be described with reference to FIG. 9.

In the description of this second embodiment, the same reference numerals are used for structural components that are substantially the same as for the cover of the first embodiment described above, and duplicated description will be avoided.

The first opening section 35 of the holder 3 of the cover 1 of the second embodiment is different from the first embodiment in that it is formed on an upper part of the holder 3. Specifically, with the second embodiment the front surface section 31 and the rear surface section 32 are connected at their lower ends, and an upper end opens and closes.

Also, the second opening section 42 of the pouch body 4 of this embodiment is different from the first embodiment in that it is formed on an upper end of the pouch body 4.

Further, as the camera 2, in this embodiment a so-called digital camera is used. This camera 2 is different from the first embodiment in that it is not provided with a winding section. Accordingly, the holder 3 of the second embodiment is not provided with a through hole for the winding section.

With the cover 1 of this embodiment also, since the first opening section 35 and the second opening section 42 are arranged in the same orientation, it is possible to fit and remove a camera 2 to a cover 1 through the opening section. Other structures and advantages are basically the same as for the first embodiment, and so description will be omitted.

Third Embodiment

Figure 10:
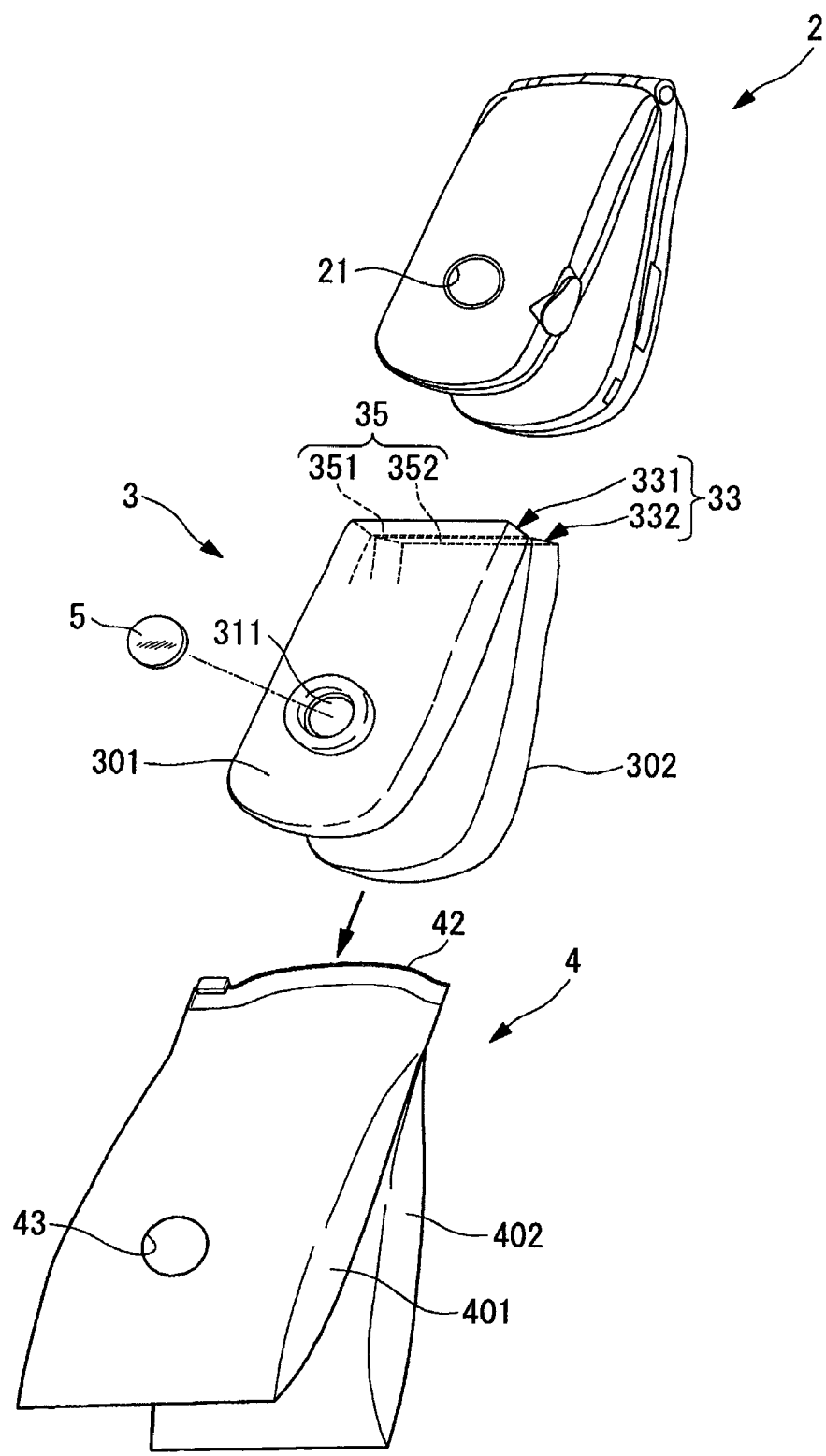
FIG. 10 is a broken down perspective view of a waterproof camera cover of a third embodiment of the present invention.

Next, a waterproof cover of a third embodiment of the present invention will be described with reference to FIG. 10. In the description of this third embodiment also, the same reference numerals are used for structural components that are substantially the same as for the cover of the first embodiment described above, and duplicated description will be avoided.

With this embodiment, a so-called foldable mobile phone having a built in camera is used as the camera 2. This camera 2 is different from the first embodiment in that it is not provided with a winding section, a viewfinder or a flash unit. However, it is provided with a lens 21 and a shutter button (not shown).

The holder 3 of the cover 1 of the third embodiment is different from the first embodiment in that it is provided with a front side holder section 301 and a rear side holder section 302. A front side storage space 331 is formed inside the front side holder section 301. A rear side storage space 332 is formed inside the rear side holder section 302. The first storage space 33 of the third embodiment is made up of a front side storage space 331 and a rear side storage space 332. One end of the front side storage space 331 (upper end in the drawing) constitutes a front side opening section 351, and one end of the rear side storage space 332 (upper end in the drawing) constitutes a rear side opening section 352. With this embodiment, the first opening section 35 of the holder 3 is constituted by the front side opening section 351 and the rear side opening section 352. With the third embodiment, differing from the first embodiment, a mechanism for closing the first opening section 35 is not provided.

The front side holder section 301 is formed with a through hole 311 (first through hole) for in front of the lens. A through hole (not shown) for operation of the shutter button is formed in the rear side holder section 302.

Also, the second opening section 42 of the pouch body 4 of this embodiment is different from the first embodiment in that it is formed on an upper end of the pouch body 4. Further, a lower part of the pouch body 4 of this embodiment is branched into two, and in this way a front side branch section 401 and a rear side branch section 402 are formed. A through hole (second through hole) 43 for in front of the lens is formed in the front side branched section 401.

With the cover 1 of this embodiment, a front side holder section 301 of the holder 3 is housed in a front side branched section 401 of the pouch body 4, and a rear side holder section 302 is housed in the rear side branched section 402.

With the cover 1 of this embodiment also, since the first opening section 35 and the second opening section 42 are arranged in the same orientation, it is possible to fit and remove a camera 2 to a cover 1 through the opening section. Here, with the cover 1 of this embodiment one part of the camera 2, which is of a foldable type, is housed in the front side storage space 331, and the other part is housed in the rear side storage space 332. Other structures and advantages are basically the same as for the first embodiment, and so description will be omitted.

The description of the above-described embodiments is merely an example, and does not show the essential structure of the present invention. The structure of each part of the present invention is not limited to the above-described embodiments as long as they fall within the scope of the invention.

For example, the holder 3 of this embodiment covers the whole of the camera 2, but this is not limiting and it is also possible to form a shape covering part of the camera 2, for example, forming an annular shape like a belt being tied.

Also, in the above description, the inside of the cover 1 is assumed to be empty in an initial state, but it is also possible to sell in a state where the camera 2 is fitted in advance inside the cover 1.

EXPLANATION ON NUMERALS USED IN THE EMBODIMENTS 1 cover
2 camera (single-use camera)
21 lens
22 viewfinder
23 flash
24 flash operating switch
25 shutter button
26 winding section
3 holder
31 front surface section
301 front holder section
302 rear holder section
311 through hole for in front of lens (first through hole)
311a protruding section
311b flange section
312 through hole for in front of viewfinder
313 through hole for in front of flash
314 through hole for in front of shutter
32 rear surface section
321 through hole for winding section
322 through hole for viewfinder
323 protruding section
33 first storage space
331 front storage space
332 rear storage space
34 connecting section
35 first opening section
351 front opening section
352 rear opening section
4 pouch body
41 second storage space
42 second opening section
401 front branched section

402 rear branched section
421 slider
43 through hole for in front of lens (second through hole)
44 folded section
441 bottom section
5 transparent body

What is claimed is:

1. A waterproof camera cover, comprising a holder, a pouch body and a transparent body, wherein the holder comprises a first storage space, a first opening section and a first through hole;

the first storage space constructed to house a camera inside;

the first opening section constructed to enable housing or taking out of a camera in the first storage space via this first opening section;

the first through hole formed at a position so that the first through hole faces a lens of a camera when a camera is housed in the first storage space;

the pouch body comprises a second storage space, a second opening section and a second through hole, the holder being contained inside the second storage space;

the second opening section formed to fit a camera into the inside and constructed to enable a camera to be housed in or taken out of the first storage space of the holder via the second and first opening sections, by being arranged in the same orientation as the first opening section; and wherein the second opening section is constructed so that it can be opened and closed, and when closed, prevents water from leaking into the inside of the pouch body via the second opening section;

the second through hole positioned facing the first through hole;

the transparent body arranged at a position facing a lens of a camera when a camera is housed in the first storage space; and the first and second through holes are closed off by the transparent body so that water is prevented from leaking into the inside of the pouch body or the holder from the outside, wherein the waterproof camera cover is further provided with a folded section having at least one pleat, the folded section being formed so that the pouch body is folded inwards close to an end part of the pouch body, and further, the folded section is formed to a depth such that a user's finger will reach a winding section of the camera in a state where a user's finger is inserted into the inside of the folded section, and wherein the folded section is expanded upon winding of the winding section of the camera and upon release of the winding section, the folded section is restored to a shape close to the initial folded shape so as to ensure an amount of folding required in the next winding operation, and wherein the winding section of the camera is a dial shape.

2. The water proof camera cover of claim 1, wherein a peripheral edge of the first through hole and a peripheral edge of the transparent body are closely attached so that water is prevented from leaking into the holder through the first through hole, and a peripheral edge of the second through hole and a peripheral edge of the first through hole are closely attached so that water is prevented from leaking between the pouch body and the holder through the second through hole.

3. The waterproof camera cover of claim 1, wherein the pouch body is made from vinyl chloride.

4. The waterproof camera cover of claim 1, wherein the pouch body is formed from a transparent material.

5. The waterproof camera cover of claim 1, wherein the holder is made in a shape that covers the whole of a camera.

6. The waterproof camera cover of claim 1, wherein the transparent body is formed from polycarbonate.

7. The waterproof camera cover of claim 1, wherein
the holder is provided with one or a plurality of other through holes formed at a position that faces a viewfinder, flash unit, shutter button or winding section of a camera, when a camera is housed in the first storage space.

8. A waterproof camera, comprising the waterproof camera cover of claim 1 and a camera, wherein
the camera is housed inside a first storage space in the holder, and
a lens of the camera is arranged at a position corresponding to the first through hole of the holder.

* * * * *